US011561955B2

United States Patent
Kelly et al.

(10) Patent No.: US 11,561,955 B2
(45) Date of Patent: *Jan. 24, 2023

(54) SYSTEMS AND METHODS FOR UPDATING A KNOWLEDGE GRAPH THROUGH USER INPUT

(71) Applicant: Rovi Guides, Inc., San Jose, CA (US)

(72) Inventors: Timothy Christensen Kelly, Austin, TX (US); Patrick Gerard Morgan, Wynnewood, PA (US); Brian Peterson, Barrington, IL (US); Walter R. Klappert, North Hollywood, CA (US)

(73) Assignee: ROVI GUIDES, INC., San Jose, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 17/151,931

(22) Filed: Jan. 19, 2021

(65) Prior Publication Data

US 2021/0165774 A1   Jun. 3, 2021

Related U.S. Application Data

(63) Continuation of application No. 16/133,134, filed on Sep. 17, 2018, now Pat. No. 10,929,372, which is a continuation of application No. 14/697,196, filed on Apr. 27, 2015, now Pat. No. 10,078,651.

(51) Int. Cl.
| | |
|---|---|
| *G06F 16/23* | (2019.01) |
| *G06F 16/21* | (2019.01) |
| *G06F 16/36* | (2019.01) |
| *G06F 40/279* | (2020.01) |

(52) U.S. Cl.
CPC ........... *G06F 16/23* (2019.01); *G06F 16/217* (2019.01); *G06F 16/367* (2019.01); *G06F 40/279* (2020.01)

(58) Field of Classification Search
CPC ...... G06F 16/23; G06F 16/217; G06F 16/367; G06F 40/279
USPC .................................................. 707/736–737
See application file for complete search history.

(56) References Cited

U.S. PATENT DOCUMENTS

| | | | |
|---|---|---|---|
| 5,953,718 | A | 9/1999 | Wical |
| 6,026,388 | A | 2/2000 | Liddy et al. |
| 6,035,305 | A | 3/2000 | Strevey et al. |
| 6,075,530 | A | 6/2000 | Lucas et al. |
| 6,134,563 | A | 10/2000 | Clancey et al. |
| 6,239,794 | B1 | 5/2001 | Yuen et al. |
| 6,388,714 | B1 | 5/2002 | Schein et al. |
| 6,460,034 | B1 | 10/2002 | Wical |

(Continued)

FOREIGN PATENT DOCUMENTS

| | | |
|---|---|---|
| WO | 2010017159 A1 | 2/2010 |
| WO | 2014186972 A1 | 11/2014 |

*Primary Examiner* — Hanh B Thai
(74) *Attorney, Agent, or Firm* — Haley Guiliano LLP

(57) ABSTRACT

Methods and systems are disclosed herein for updating a knowledge graph based on a user confirmation. A media guidance application receives a user communication and isolates a term of the user communication. The media guidance application identifies a candidate component of a knowledge graph associated with the term. The media guidance application requests user input directed to confirming whether the term is associated with the candidate component. In response to receiving the user input, the media guidance application modifies a strength of association between the term and the component.

20 Claims, 6 Drawing Sheets

(56) References Cited

U.S. PATENT DOCUMENTS

| | | |
|---|---|---|
| 6,564,378 B1 | 5/2003 | Satterfield et al. |
| 6,756,997 B1 | 6/2004 | Ward et al. |
| 6,813,368 B1 | 11/2004 | Khanna et al. |
| 7,165,098 B1 | 1/2007 | Boyer et al. |
| 7,401,087 B2 | 7/2008 | Copperman et al. |
| 7,434,099 B2 | 10/2008 | Flynn et al. |
| 7,761,892 B2 | 7/2010 | Ellis et al. |
| 8,046,801 B2 | 10/2011 | Ellis et al. |
| 8,352,245 B1 | 1/2013 | Lloyd |
| 8,442,940 B1 | 5/2013 | Faletti et al. |
| 8,706,653 B2 | 4/2014 | Kasneci et al. |
| 9,158,838 B2 | 10/2015 | Peoples et al. |
| 9,448,987 B2 | 9/2016 | Rajkumar |
| 9,582,608 B2 | 2/2017 | Bellegarda |
| 9,977,779 B2 | 5/2018 | Winer |
| 10,078,651 B2 | 9/2018 | Kelly et al. |
| 10,929,372 B2 | 2/2021 | Kelly et al. |
| 2002/0103777 A1 | 8/2002 | Zhang |
| 2002/0174430 A1 | 11/2002 | Ellis et al. |
| 2003/0110499 A1 | 6/2003 | Knudson et al. |
| 2005/0096913 A1 | 5/2005 | Coffman et al. |
| 2005/0251827 A1 | 11/2005 | Ellis et al. |
| 2007/0100814 A1 | 5/2007 | Lee et al. |
| 2008/0052496 A1 | 2/2008 | Fujita |
| 2008/0222103 A1 | 9/2008 | Zhang et al. |
| 2009/0024590 A1 | 1/2009 | Sturge et al. |
| 2010/0114557 A1 | 5/2010 | Fuji et al. |
| 2010/0153885 A1 | 6/2010 | Yates |
| 2010/0274818 A1 | 10/2010 | Chauvin et al. |
| 2011/0137919 A1 | 6/2011 | Ryu et al. |
| 2012/0331064 A1 | 12/2012 | Deeter et al. |
| 2013/0110519 A1 | 5/2013 | Cheyer et al. |
| 2013/0159288 A1 | 6/2013 | Nikankin |
| 2013/0211820 A1 | 8/2013 | Cho et al. |
| 2013/0275429 A1* | 10/2013 | York ................... G06F 16/435 707/E17.002 |
| 2014/0079297 A1 | 3/2014 | Tadayon et al. |
| 2014/0149376 A1* | 5/2014 | Kutaragi ............ G06F 16/5854 707/706 |
| 2014/0201126 A1 | 7/2014 | Zadeh et al. |
| 2014/0229161 A1 | 8/2014 | Gliozzo |
| 2014/0229163 A1 | 8/2014 | Gliozzo |
| 2014/0245335 A1 | 8/2014 | Holden et al. |
| 2014/0279726 A1 | 9/2014 | Cheng et al. |
| 2014/0279837 A1 | 9/2014 | Guo et al. |
| 2014/0280307 A1 | 9/2014 | Gupta et al. |
| 2014/0282219 A1* | 9/2014 | Haddock ................ G06F 16/22 715/781 |
| 2014/0289323 A1 | 9/2014 | Kutaragi et al. |
| 2014/0351241 A1 | 11/2014 | Leask et al. |
| 2014/0351261 A1 | 11/2014 | Aswani et al. |
| 2014/0356846 A1* | 12/2014 | Su .......................... G06N 5/043 434/362 |
| 2014/0358929 A1 | 12/2014 | Bailey et al. |
| 2015/0039292 A1 | 2/2015 | Suleman et al. |
| 2015/0095105 A1 | 4/2015 | Fitts |
| 2015/0278691 A1 | 10/2015 | Xia et al. |
| 2015/0379409 A1 | 12/2015 | Hu et al. |
| 2016/0055409 A1 | 2/2016 | Majumdar et al. |
| 2016/0103932 A1 | 4/2016 | Sathish et al. |
| 2016/0163311 A1* | 6/2016 | Crook .................. G10L 15/183 704/275 |
| 2016/0314158 A1 | 10/2016 | Kelly et al. |
| 2019/0012340 A1 | 1/2019 | Kelly et al. |

\* cited by examiner

SYSTEMS AND METHODS FOR UPDATING A KNOWLEDGE GRAPH THROUGH USER INPUT

CROSS-REFERENCE TO RELATED APPLICATIONS

This application is a continuation of U.S. patent application Ser. No. 16/133,134, filed on Sep. 17, 2018, which is a continuation of U.S. patent application Ser. No. 14/697,196, filed on Apr. 27, 2015, now U.S. Pat. No. 10,078,651, the disclosures of which are hereby incorporated by reference herein in their entireties.

BACKGROUND OF THE INVENTION

The sheer number of media assets available to users makes it very difficult for users to determine which media assets they will be likely to enjoy. Users may rely on media guidance applications to provide recommendations to users about media assets they are likely to enjoy. Traditional media guidance applications may base their recommendations of media assets on media assets that are related to a user's known interests. However, these recommendations do not take into account user's casual references to certain media assets during conversational communication.

SUMMARY

Accordingly, methods and systems are provided for updating a knowledge graph. The knowledge graph may be updated based on a user's casual communication to provide more relevant recommendations to the user. A knowledge graph may be a collection of data organized to store relationships between different pieces of information. In some embodiments, the media guidance application may receive a user communication. In some aspects, the user communication may be a textual communication such as an e-mail, a text message, a post on a social media website, a letter, or a chat message. In some aspects, the user communication may be verbal, such as a telephone conversation, a voicemail message, a video call, a conference call, or a video recording.

In some embodiments, the media guidance application may isolate a term of the user communication. For example, the media guidance application may receive a user communication that is a text message from a user to his friend saying "Want to see the middle-earth movie this weekend?" The media guidance application may isolate the term "middle-earth movie" from the user communication. In some aspects, the media guidance application may isolate the term from the user communication using templates. For example, the media guidance application may match the user communication to a template such as "Want to see the [TERM] is this weekend?". In some aspects, the media guidance application may isolate the term based on predetermined heuristics. For example, the media guidance application may use a heuristic that the subject of the sentence should be isolated to isolate the term "middle-earth movie" from the user communication. The term may be any portion of the user communication. In some embodiments, the term may be the entire user communication.

In some embodiments, the media guidance application may identify a candidate component of a knowledge graph associated with the term. For example, the media guidance application may isolate the term "middle-earth movie" in the user communication of a text message saying "Want to see the middle-earth movie this weekend?" The media guidance application may identify the movie "The Hobbit" in a knowledge graph as being a candidate component associated with the term, as "The Hobbit" is a movie about a fictional land called "Middle-Earth". In some aspects, the media guidance application may identify the candidate component by cross-referencing the term with the knowledge graph. For example, the media guidance application may cross-reference the term "middle-earth movie" with entries in a database comprising titles and synopses of several movies to identify that the movie "The Hobbit" may be associated with the term. In some aspects, the media guidance application may identify the candidate component by ranking a plurality of candidate components and picking the highest ranked candidate component. For example, the media guidance application may identify several movies in a knowledge graph that are about a fictional land called "Middle-Earth", such as "The Fellowship of the Ring", "The Two Towers", and "The Hobbit". The media guidance application may rank these movies based on their release dates, giving "The Hobbit" the highest ranking, "The Two Towers" the second highest ranking, and "The Fellowship of the Ring" the lowest ranking. The media guidance application may identify "The Hobbit" as the candidate component as it is the highest ranked of the plurality of candidate components. The media guidance application may use any relevant criteria to rank the plurality of candidate components.

In some embodiments, the media guidance application may request user input directed to confirming whether the term is associated with the candidate component. For example, the media guidance application may identify "The Hobbit" as a candidate component associated with the term "middle-earth movie" in the user text message saying "Want to see the middle-earth movie this weekend?" The media guidance application may send the user an e-mail asking "In your message, did you mean 'The Hobbit'?" The media guidance application may present the user with options to confirm or deny whether the term "middle-earth movie" is associated with the candidate component "The Hobbit". In some aspects, the media guidance application may provide the user with additional information about the candidate component "The Hobbit". For example, the media guidance application may provide the users with show times, ticket prices, and locations for theatres currently playing the movie "The Hobbit". In some aspects, the media guidance application may provide the users with additional information about an additional component of the knowledge graph that has high strength of association between the term and the additional component. For example, the media guidance application may identify that the "Lord of the Rings" is a movie trilogy about the fictional land of "Middle-Earth" and has a high strength of association with the term "middle-earth movie" used by the user. The media guidance application may provide the user with a synopsis of the plot of the "Lord of the Rings" trilogy.

In some aspects, the media guidance application may request user input confirming whether a strength of association between the term and the candidate component should be changed. For example, the media guidance application may identify "Amber Heard" as a candidate component associated with an isolated term "Johnny Depp" in a user text message saying "I heard Johnny Depp married Amber Heard!" The media guidance application may request user input confirming whether the strength of association between the term "Johnny Depp" and the candidate component "Amber Heard" should be changed by sending the user an e-mail asking "Do you think the connection between Johnny Depp and Amber Heard is getting stronger?" In response to receiving user input confirming that the connection between Johnny Depp and Amber Heard is getting stronger, the media guidance application may increase the strength of association between the term "Johnny Depp" and the candidate concept "Amber Heard". The media guidance application may cause a value in the knowledge graph containing the candidate concept "Amber Heard" to be changed to increase the strength of association between the term "Johnny Depp" and the candidate concept "Amber Heard".

In some embodiments, the media guidance application may modify a strength of association between the term and the candidate component in response to receiving the user input. The media guidance application may modify the strength of association by modifying a value in a knowledge graph. For example, the media guidance application may request user input by sending the user an e-mail asking "In your message, did you mean 'The Hobbit'?" The media guidance application may determine that the user confirmed the association if it receives a user selection of a "YES" button provided in the e-mail. In response to receiving the user input, the media guidance application may increase the strength of association between the term "middle-earth movie" and the candidate component movie "The Hobbit". In some aspects, if the user denies the association between the term and the candidate component, the media guidance application may decrease the strength of association between the term and the candidate component.

In some aspects, the media guidance application may change the strength of association by identifying that the candidate component is associated with a first node in the knowledge graph, the term is associated with a second node in the knowledge graph, and changing the value associated with an edge connecting the first node to the second node. For example, "The Hobbit" may be one node in the knowledge graph and "middle-earth movie" may be a second node in the knowledge graph. The media guidance application may increase the value associated with an edge connecting the first node and the second node in response to receiving the user input, to represent an increased strength of association. In some aspects, the media guidance application may modify the strength of association by creating a component in the knowledge graph. For example, the media guidance application may create a node in the knowledge graph corresponding to the term "middle-earth movie", create an edge connecting the new node to the node representing the movie "The Hobbit", and then change the value associated with the edge.

In some aspects, the media guidance application may present the user with a next-highest-ranked candidate component of a plurality of candidate components if the user denies an association between the term and the candidate component. For example, the media guidance application may rank a plurality of candidate components associated with the term "middle-earth movie" as follows, based on their release dates with more recent releases being ranked higher: "The Hobbit", "The Two Towers", and "The Fellowship of the Ring". The media guidance application may receive user input denying an association between the term "middle-earth movie" and "The Hobbit", by receiving a user selection of a "NO" button to respond to the question "In your message, did you mean 'The Hobbit'?". In response to receiving the user input, the media guidance application may choose "The Two Towers" as the candidate component, and request user input confirming whether the term "middle-earth movie" is associated with the candidate component "The Two Towers".

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
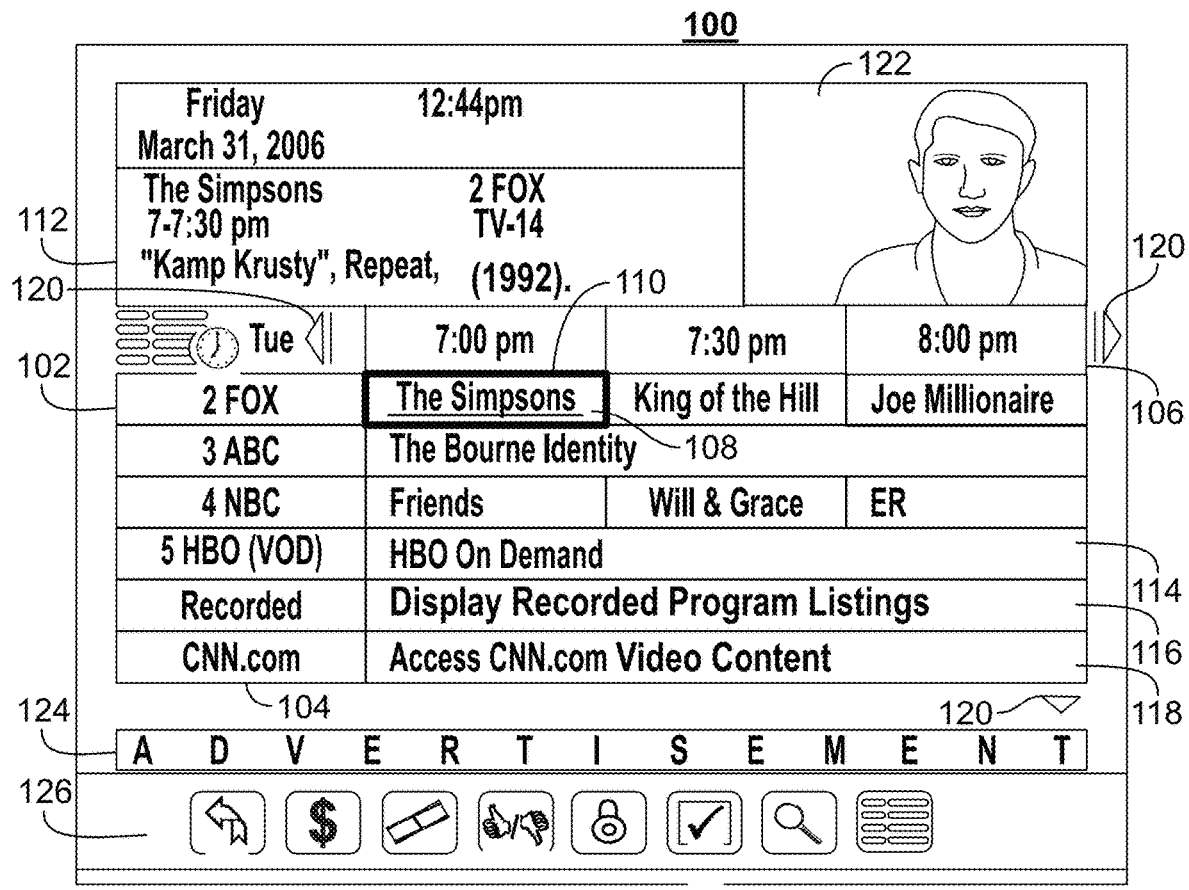
FIG. 1 shows in illustrative example of a display screen generated by a media guidance application, in accordance with some embodiments of the disclosure.

Methods and systems are provided for updating a knowledge graph. The knowledge graph may be updated based on a user's casual communication to provide more relevant recommendations to the user. As referred to herein, a knowledge graph may be a collection of data organized to store relationships between different pieces of information. In some embodiments, the media guidance application may receive a user communication. In some aspects, the user communication may be a textual communication such as an e-mail, a text message, a post on a social media website, a letter, or a chat message. In some aspects, the user communication may be verbal, such as a telephone conversation, a voicemail message, a video call, a conference call, or a video recording.

In some embodiments, the media guidance application may isolate a term of the user communication. For example, the media guidance application may receive a user communication that is a text message from a user to his friend saying "Want to see the middle-earth movie this weekend?" The media guidance application may isolate the term "middle-earth movie" from the user communication. In some aspects, the media guidance application may isolate the term from the user communication using templates. For example, the media guidance application may match the user communication to a template such as "Want to see the [TERM] this weekend?" In some aspects, the media guidance application may isolate the term based on pre-determined heuristics. For example, the media guidance application may use a heuristic that the subject of the sentence should be isolated to isolate the term "middle-earth movie" from the user communication. The term may be any portion of the user communication. In some embodiments, the term may be the entire user communication.

In some embodiments, the media guidance application may identify a candidate component of a knowledge graph associated with the term. For example, the media guidance application may isolate the term "middle-earth movie" in the user communication of a text message saying "Want to see the middle-earth movie this weekend?" The media guidance application may identify the movie "The Hobbit" in a knowledge graph as being a candidate component associated with the term, as "The Hobbit" is a movie about a fictional land called "Middle-Earth". In some aspects, the media guidance application may identify the candidate component by cross-referencing the term with the knowledge graph. For example, the media guidance application may cross-reference the term "middle-earth movie" with entries in a database comprising titles and synopses of several movies to identify that the movie "The Hobbit" may be associated with the term.

In some embodiments, the media guidance application may request user input directed to confirming whether the term is associated with the candidate component. For example, the media guidance application may identify "The Hobbit" as a candidate component associated with the term "middle-earth movie" in the user text message saying "Want to see the middle-earth movie this weekend?" The media guidance application may send the user an e-mail asking "In your message, did you mean 'The Hobbit'?" The media guidance application may present the user with options to confirm or deny whether the term "middle-earth movie" is associated with the candidate component "The Hobbit.

In some aspects, the media guidance application may request user input confirming whether a strength of association between the term and the candidate component should be changed. As referred to herein, a strength of association corresponds to a value in a knowledge graph. The value in the knowledge graph may be associated with an association between a term and a candidate component. For example, the media guidance application may identify "Amber Heard" as a candidate component associated with an isolated term "Johnny Depp" in a user text message saying "I heard Johnny Depp married Amber Heard!" The media guidance application may request user input confirming whether the strength of association between the term "Johnny Depp" and the candidate component "Amber Heard" should be changed by sending the user an e-mail asking "Do you think the connection between Johnny Depp and Amber Heard is getting stronger?" In response to receiving user input confirming that the connection between Johnny Depp and Amber Heard is getting stronger, the media guidance application may increase the strength of association between the term "Johnny Depp" and the candidate concept "Amber Heard". The media guidance application may cause a value in the knowledge graph containing the candidate concept "Amber Heard" to be changed to increase the strength of association between the term "Johnny Depp" and the candidate concept "Amber Heard".

In some embodiments, the media guidance application may modify a strength of association between the term and the candidate component in response to receiving the user input. For example, the media guidance application may request user input by sending the user an e-mail asking "In your message, did you mean 'The Hobbit'?" The media guidance application may determine that the user confirmed the association if it receives a user selection of a "YES" button provided in the e-mail. In response to receiving the user input, the media guidance application may increase the strength of association between the term "middle-earth movie" and the candidate component movie "The Hobbit". In some aspects, if the user denies the association between the term and the candidate component, the media guidance application may decrease the strength of association between the term and the candidate component.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
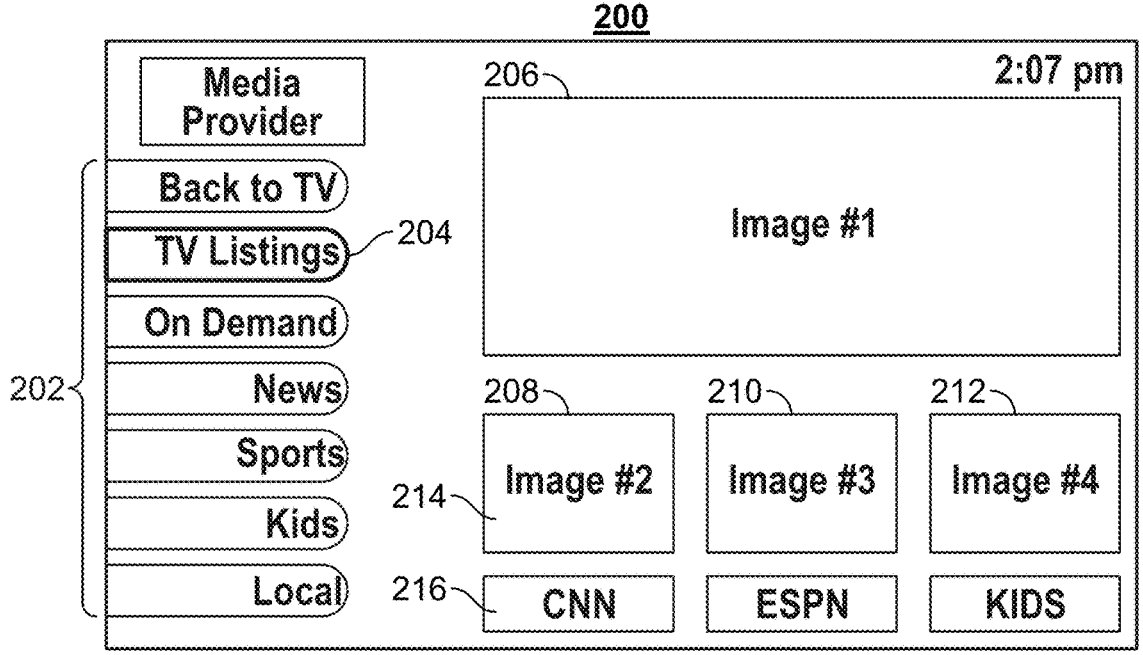
FIG. 2 shows another illustrative example of a display screen generated by a media guidance application, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
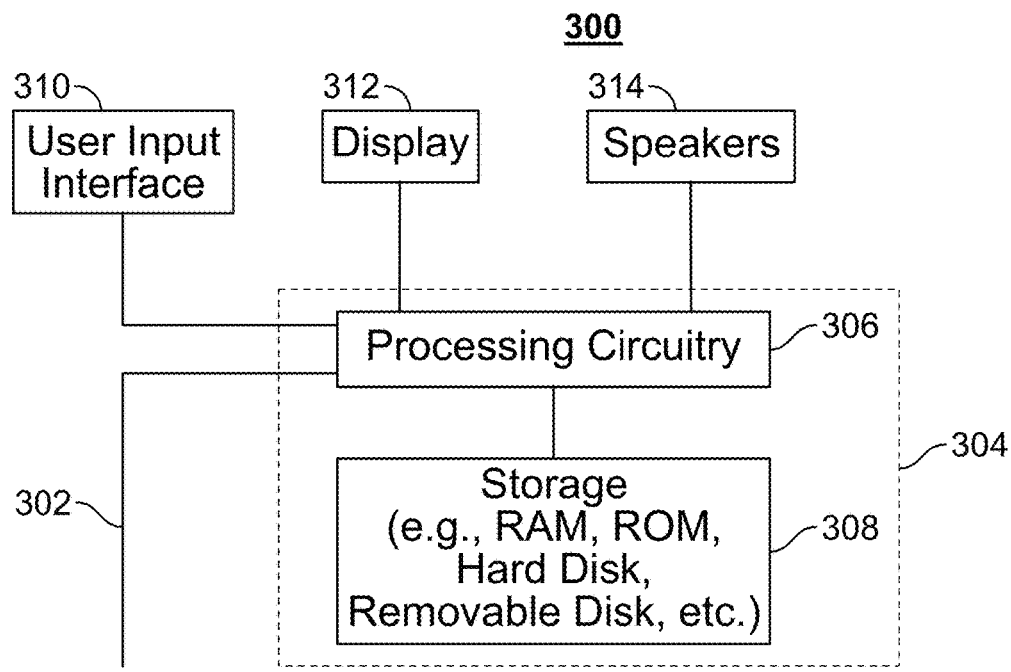
FIG. 3 is a block diagram of an illustrative user equipment device, in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
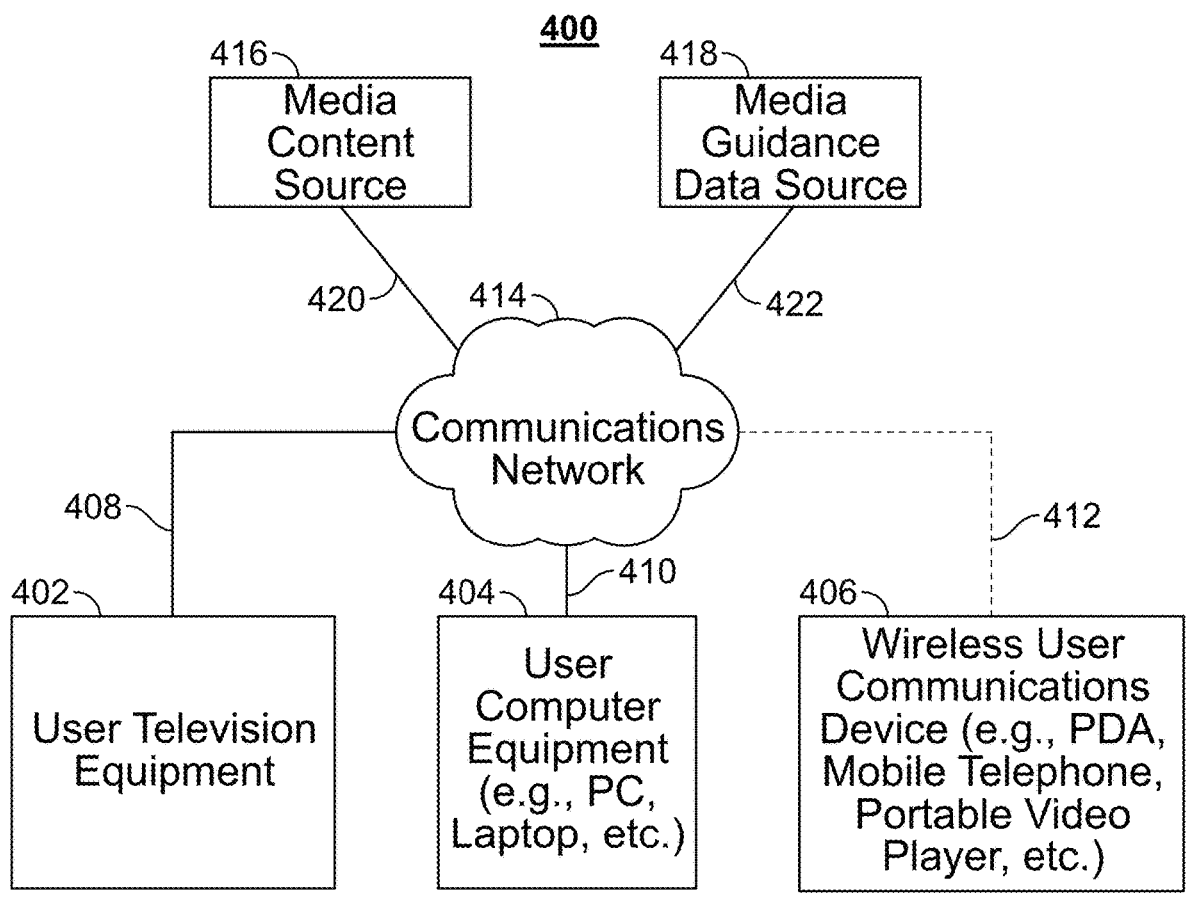
FIG. 4 is a block diagram of an illustrative media system, in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
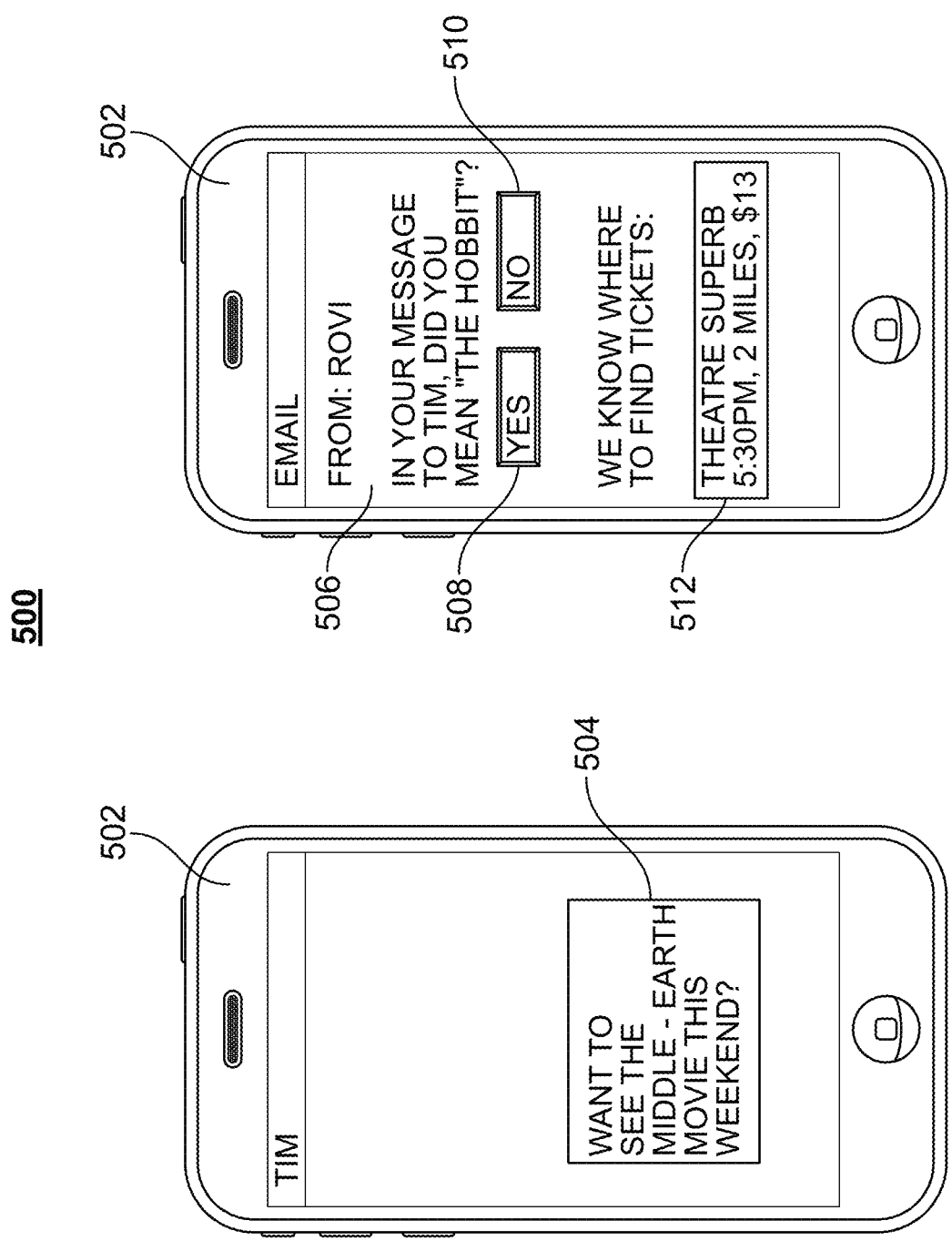
FIG. 5 shows an illustrative embodiment of user equipment on which a communication from the user and information provided by the media guidance application are displayed, in accordance with some embodiments of the disclosure.

FIG. 5 shows an illustrative embodiment of user equipment on which a communication from the user and information provided by the media guidance application are displayed in accordance with some embodiments of the disclosure. Screenshots 500 depict an embodiment through which the media guidance application may obtain information from a user that is used to update a knowledge graph. User device 502 is depicted as being a smartphone with the media guidance application. In some embodiments, user device 502 may be other types of user equipment with the media guidance application. For example, user device 502 may be any one of user television equipment 402, user computer equipment 404, and user wireless communications device 406, without departing from the scope of this disclosure. User device 502 may be connected to communications network 414. For example, user device 502 may be connected to a phone network to enable the user to send text messages, and to an internet network to enable the user to receive e-mail messages.

User communication 504 is depicted as being a text message in FIG. 5. However, user communication 504 may be any type of a textual or verbal user communication. Textual user communications may include text messages, e-mails, letters, blog posts, updates on a social media website, and chat messages. Verbal user communications may include phone calls, video calls, voicemail messages, and video messages. Textual user communications may be displayed on display 312. Verbal user communications 504 may be output through speakers 314. The media guidance application may enable the user to create user communication 504 using user input interface 310. User communication 504 may be sent from the user to one or more of the user's contacts through communications network 314. The media guidance application may intercept user communication 504 when it is sent from the user to one or more of the user's contacts. In some embodiments, user communication 504 may be a communication sent from the user to the media guidance application using user input interface 310. For example, the media guidance application may receive user communication 504 sent from the user to the media guidance application, saying "I want to see the middle-earth movie this weekend". In response to receiving this user communication 504, the media guidance application may isolate the term "middle-earth movie", identify that the candidate component "The Hobbit" is related to the isolated term, and generate query 506 to ask the user to confirm if the isolated term is associated with the candidate component. The media guidance application may modify a strength of association between the term and the candidate component based on the user's input.

The media guidance application may isolate a term in user communication 504 using control circuitry 304. In some embodiments, the media guidance application may isolate the term by identifying the subject of user communication 504. For example, the subject of user communication 504 "Want to see the middle-earth movie this weekend?" may be "middle-earth movie". The media guidance application may isolate the term "middle-earth movie". In some embodiments, the media guidance application may store templates of user communications in a database in storage circuitry 308. The media guidance application may cross-reference user communication 504 with the templates stored in the database to identify a template closest to user communication 504, and use the template to isolate a term in user communication 504. For example, the media guidance application may store a template "Want to see [TERM] this weekend?" in a database in storage circuitry 308. The media guidance application may cross-reference user communication 504 with the storage circuitry to determine that the template matches user communication 504. The media guidance application may use the template to isolate the term "middle-earth movie" from user communication 504.

In some embodiments, user communication 504 may be a verbal communication. The media guidance application may determine a textual transcript of the verbal communication, and then identify the subject of the textual transcript. In some embodiments, the media guidance application may remove speech artifacts such as pauses, laughing, or fillers such as "umm" from the textual transcript of the verbal communication.

The media guidance application may identify a candidate component of a knowledge graph associated with the term "middle-earth movie". For example, the media guidance application may identify that the movie "The Hobbit" is a node in the knowledge graph that is a candidate component associated with the term "middle-earth movie". This process is described in more detail in relation to FIG. 6.

The media guidance application may then request user input directed to confirming whether the term is associated with the candidate component. The media guidance application may use processing circuitry 306 to generate a natural language query 506. The media guidance application may present query 506 to the user as a pop-up, an e-mail, a voice mail, or one or more of any of the types of user communication 504. In FIG. 5, media guidance application presents query 506 to the user as an e-mail. The media guidance application may present query 506 to the user through display 312 or speakers 314. The media guidance application may store several templates in a database using storage circuitry 308. The media guidance application may identify an appropriate template and use it to form query 506. For example, the media guidance application may store template "In your [COMMUNICATION] to [CONTACT], did you mean [CANDIDATE COMPONENT]?" in a database using storage circuitry 308. The media guidance application may identify that this template needs information about the type of user communication 504, the contact user communication 504 is intended for, and a candidate component. The media guidance application may determine that the type of user communication 504 is "message", the contact user communication 504 is intended for is "Tim", and the candidate component is "The Hobbit". The media guidance application may then generate query 506 that says "In your message to Tim, did you mean 'The Hobbit'?" The media guidance application may present query 506 to the user on user device 502 through display 312 or speakers 314.

The media guidance application may present query 506 to the user on user device 502, or any other device associated with the user. For example, the media guidance application may receive user communication 504 that a user sent using a smartphone user device 502. The media guidance application may determine that the user's attention has shifted to user television equipment 402 by tracking the user's gaze or body language, monitoring the user's activity, or accessing past user behavior patterns. The media guidance application may present query 506 on user television equipment 402 so that the user receives query 506 through a device that the user is paying attention to.

The media guidance application may format query 506 differently based on the device it is presented on. For example, the media guidance application may format query 506 to be suitable for display 312 if the media guidance application is presenting query 506 on a television, while the media guidance application may format query 506 to be suitable for speakers 314 if the media guidance application is presenting query 506 on a radio. The media guidance application may present query 506 on a different device if the user does not respond to query 506 on user device 502 within a threshold amount of time. For example, if the user does not respond to query 506 on user device 502 within a week, the media guidance application may display query 506 on user television equipment 402, user computer equipment 404, or wireless user communications device 406.

The media guidance application uses query 506 to request user input directed to confirming whether the term "middle-earth movie" is associated with the candidate component of the movie "The Hobbit". The media guidance application may receive confirmation that the term "middle-earth movie" is associated with the candidate component "The Hobbit" by receiving a user selection of affirmative button 508. The media guidance application may receive user input denying that the term "middle-earth movie" is associated with the candidate component "The Hobbit" by receiving user selection of negative button 510. In some embodiments, the user input may take the form of user conversation that is parsed by the media guidance application. For example, after presenting query 506, the media guidance application may receive user input in the form of a verbal sentence stating, "Yes, that's what I meant." The media guidance application may receive this user input from user device 502 through user input interface 310 and parse it to determine that the user input confirms that the term "middle-earth movie" is related to the candidate component "The Hobbit". The media guidance application may receive user input through any medium described in relation to user input interface 310.

In response to receiving a user selection of affirmative button 508, the media guidance application may increase the strength of association between the term "middle-earth movie" and the candidate component "The Hobbit". In response to receiving a user selection of negative button 510, the media guidance application may decrease the strength of association between the term "middle-earth movie" and the candidate component "The Hobbit".

In some embodiments, query 506 may be a query directed to determining whether a strength of association between a term and a candidate component should be changed. For example, user communication 504 may say "I heard Johnny Depp married Amber Heard!" The media guidance application may isolate the term "Johnny Depp" in user communication 504 and identify a candidate component "Amber Heard" in the knowledge graph. The media guidance application may generate query 506 to determine if the strength of association between the term "Johnny Depp" and the candidate component "Amber Heard" should be changed. The media guidance application may generate query 506 that says, "Do you think the connection between Johnny Depp and Amber Heard is getting stronger?" In some embodiments, the media guidance application may generate for display affirmative button 508 and negative button 510 on display 312 to allow the user to respond to query 506. In some embodiments, the media guidance application may generate a slider to allow the user to respond to query 506 by indicating the strength of connection between "Johnny Depp" and "Amber Heard".

In some embodiments, the media guidance application may present additional information about the candidate component to the user. For example, the media guidance application may generate for display using display 312 additional information 512. The media guidance application may identify additional information 512 by cross-referencing the candidate component with information available from media content source 416 and media guidance data source 418. For example, the media guidance application may cross-reference the candidate component "The Hobbit" with information about currently playing movies at theatres near the user's current location. The user's location may be determined using GPS (Global Positioning System) circuitry in user device 502. As referred to herein, GPS circuitry is circuitry that uses satellite data to determine a location of user device 502. In some embodiments, user device 502 may use any other circuitry configured to determine a location of a user or user device 502. For example, user device 502 may determine its location by determining the location of the Wi-Fi hotspot or cell tower it is connected to. The media guidance application may determine that the movie "The Hobbit" is playing at Theatre Superb at 5:30 pm. The media guidance application may further determine that Theatre Superb is two miles from the user's current location and tickets at Theatre Superb cost $13. The media guidance application may generate for display additional information 512 for the user. In some embodiments, the media guidance application may purchase tickets for the user in response to receiving a user selection of additional information 512.

In some embodiments, the media guidance application may identify a plurality of candidate components associated with the term in user communication 504. For example, the media guidance application may determine that candidate components "The Hobbit" and "The Lord of the Rings Trilogy" are associated with the term "middle-earth movie". This may be because both "The Hobbit" and the movies in "The Lord of the Rings Trilogy" take place in a fictional land called "Middle-Earth". The media guidance application may rank the plurality of candidate components according to any applicable criteria. Applicable criteria may include dates associated with each of the candidate components, relevance to the isolated term, strength of association with the isolated term, or shared metadata with the isolated term. For example, the media guidance application may rank the candidate component "The Hobbit" higher than the candidate component "The Lord of the Rings Trilogy" as "The Hobbit" has a later release date.

In some embodiments, the media guidance application may provide information about an additional candidate component along with query 506. For example, the media guidance application may provide information about the additional component "The Lord of the Rings Trilogy" in addition to displaying query 506. Additional information 512 may contain information about "The Lord of the Rings Trilogy", such as a plot synopsis, a list of actors in the trilogy, or DVD rental locations for each of the movies in "The Lord of the Rings Trilogy".

In some embodiments, the media guidance application may generate a query about the additional component and the term, in response to receiving a denial through negative button 510 of query 506 directed to confirming whether a term is associated with a candidate component. For example, the media guidance application may rank the candidate component "The Hobbit" higher than the candidate component "The Lord of the Rings Trilogy" while identifying candidate components associated with the term "middle-earth movie". This ranking may be based on release dates, as "The Hobbit" was released after "The Lord of the Rings Trilogy". The media guidance application may generate query 506 associated with the highest ranked candidate component to confirm an association between the term "middle-earth movie" and the candidate component "The Hobbit". The media guidance application may receive a denial of the association between the term "middle-earth movie" and the candidate component "The Hobbit" through user selection of negative button 510. The media guidance application may generate a new query directed to confirming whether the term is associated with a next-highest-ranked candidate component. For example, the media guidance application may generate a query saying "In your message to Tim, did you mean 'The Lord of the Rings Trilogy'?"

Figure 6:
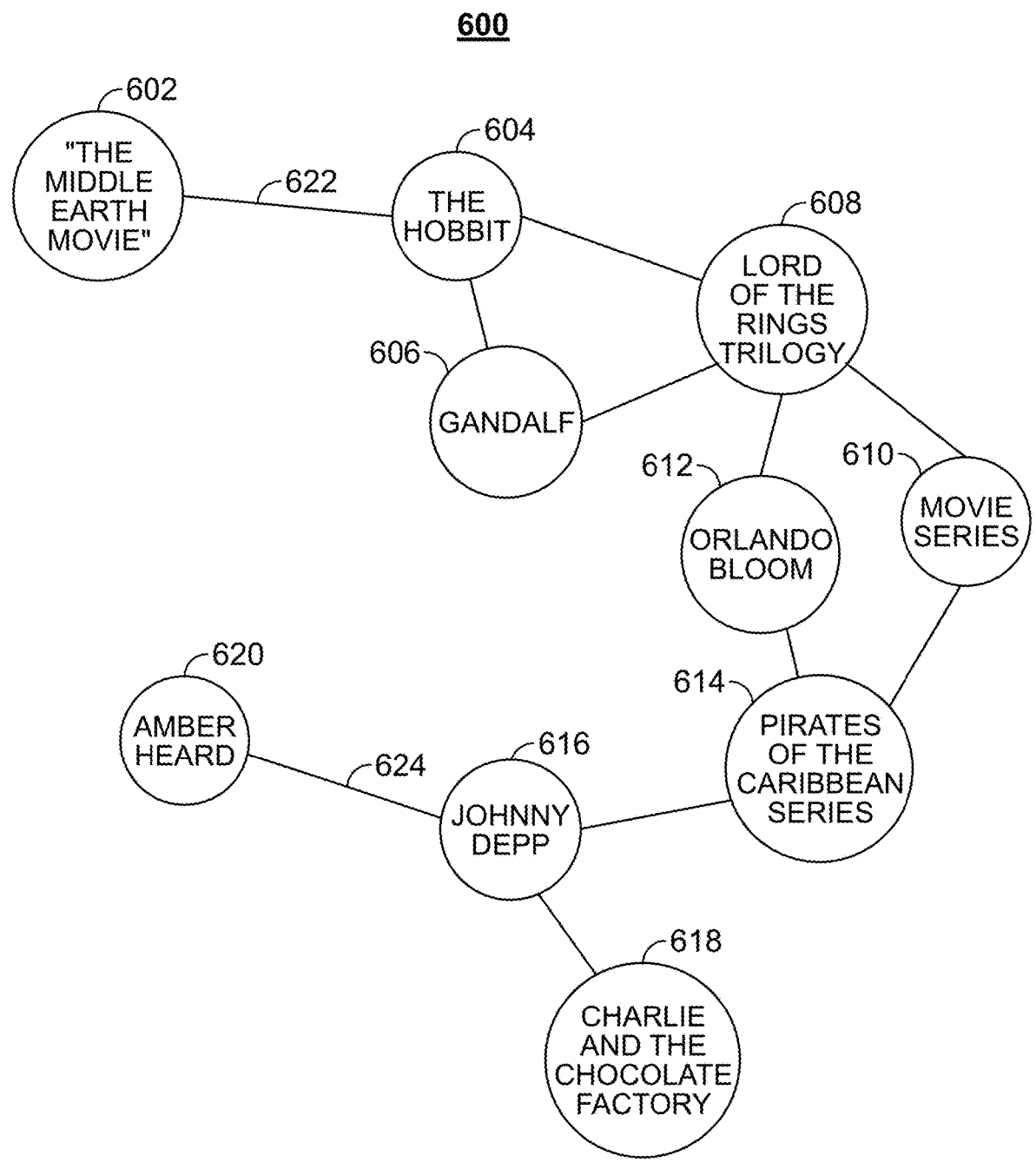
FIG. 6 shows an illustrative embodiment of a portion of a knowledge graph, in accordance with some embodiments of the disclosure.

FIG. 6 shows an illustrative embodiment of a portion of a knowledge graph in accordance with some embodiments of the disclosure. Knowledge graph 600 may be stored using storage circuitry 308. Knowledge graph 600 may be stored locally on user device 502, or stored remotely and accessed through communications network 414. Knowledge graph 600 may be stored entirely in one location, or be split into sections and each section stored at one of a plurality of locations. User device 502 may locally cache frequently used portions of the knowledge graph for quick retrieval.

Knowledge graph 600 is composed of nodes and edges. In some embodiments, knowledge graph 600 may be represented as pointer tables in storage circuitry 308. In some embodiments, data structures such as trees, bi-directional graphs, buckets, or arrays may be used to represent knowledge graph 600 in storage circuitry 308.

Although knowledge graph 600 is discussed in relation to FIG. 6 as being composed of nodes and edges, knowledge graph 600 may be any collection of data that represents objects and relationships between objects. Knowledge graph 600 may include databases, lists, and collections which represent objects and their associated relationships. Knowledge graph 600 may not necessarily use nodes and edges to represent objects and their relationships. Knowledge graph 600 as shown in FIG. 6 is merely an illustrative embodiment that may be used to represent objects and their relationships, and other representations may be used without departing from the scope of this invention. Knowledge graphs and their features are described in greater detail in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties.

Each node in knowledge graph 600 may be associated with a candidate component or a term. For example, node 602 is associated with the term "middle-earth movie" while node 604 is associated with the candidate component of the movie "The Hobbit". Each node may be associated with metadata. For example, node 604 and node 608 may be associated with metadata describing that both nodes are associated with movies that take place in the fictional land of "Middle-Earth". An edge may be created between node 604 and node 608 to represent this similarity in metadata.

In some embodiments, edges may connect nodes of different categories. For example, nodes 604 and 608 are both connected to node 606, even though nodes 604 and 608 are associated with movies and node 606 is associated with a character. In some embodiments, nodes may be connected to a plurality of other nodes. For example, nodes 612 and 610 are both connected to two other nodes: nodes 608 and 614. In some embodiments, knowledge graph 600 may represent both fictional and real connections. For example, node 616 associated with the actor "Johnny Depp" and node 618 associated with the movie "Charlie and the Chocolate Factory" are connected with an edge that represents a fictional connection, as Johnny Depp played a fictional character in the movie "Charlie and the Chocolate Factory". Node 616 is also connected to node 620 associated with actress "Amber Heard" with edge 624 that represents a real connection, as Johnny Depp is married to Amber Heard in real life.

In some embodiments, the media guidance application may identify a plurality of candidate components associated with a term by cross-referencing the term with knowledge graph 600 to identify a node corresponding to the term, and then identifying candidate components connected to the node corresponding to the term. For example, the media guidance application may identify that node 602 corresponds to the term "middle-earth movie" isolated from user communication 504. The media guidance application may then determine that "The Hobbit" is a candidate component associated with the term "middle-earth movie" as node 604 associated with "The Hobbit" is connected to node 602 through edge 622. The media guidance application may further determine that "The Lord of the Rings Trilogy" is another candidate component associated with the term "middle-earth movie" as node 608 associated with "The Lord of the Rings Trilogy" is connected to node 602 through node 604.

In some embodiments, the media guidance application may identify a plurality of candidate components associated with a term by comparing the term to the metadata associated with nodes in knowledge graph 600. For example, both nodes 604 and 608 have metadata of "Middle-Earth" as the movies associated with both nodes are located in the fictional land of "Middle-Earth". The media guidance application may cross-reference the term "middle-earth movie" with the metadata associated with nodes 604 and 608 to determine that both nodes 604 and 608 correspond to movies that are candidate components associated to the term "middle-earth movie". In some embodiments, the media guidance application may only compare the metadata of nodes in knowledge graph 600 to the term if the term is not a node in knowledge graph 600. For example, the media guidance application may only compare the metadata of nodes 604 and 608 to the term "middle-earth movie" if node 602 corresponding to the term "middle-earth movie" is not present in knowledge graph 600.

In some embodiments, edge 622 may be associated with a value that represents a strength of association. A higher value may correspond to a higher strength of association. Values may be represented as percent values, or as values on any gradient scale with or without endpoints. The media guidance application may modify this value in response to receiving user confirmation about an association between the term corresponding to node 602 and the candidate component corresponding to node 604. For example, the media guidance application may present to a user query 506 asking for confirmation of association between the term "middle-earth movie" and the candidate component "The Hobbit", and receive user input of a user selection of affirmative button 508. In response to receiving the user input, the media guidance application may determine that the term "middle-earth movie" corresponds to node 602. The media guidance application may further determine that the candidate component "The Hobbit" corresponds to node 604. The media guidance application may determine that edge 622 connects nodes 602 and 604, and modify a value associated with edge 622. The media guidance application may modify the value by instructing media content source 416 or media guidance data source 418 through communications network 414 to change the value associated with edge 622. In some embodiments, the value associated with edge 622 may be incremented by a fixed value for every user who confirms an association between nodes 602 and 604. In some embodiments, the value associated with edge 622 may be changed based on a ratio between the number of users who confirmed an association between nodes 602 and 604, and the number of users who denied an association between nodes 602 and 604. In some embodiments, the media guidance application may instruct media content source 416 or media guidance data source 418 to change the value by transmitting the new absolute value and an identifier of edge 622 through communications network 414. In some embodiments, the media guidance application may only transmit the relative change in value and an identifier of edge 622.

In some embodiments, the media guidance application may decrease the value associated with edge 622. For example, the media guidance application may receive a user input of selection of negative button 510, and determine that the strength of association between the term "middle-earth movie" and the candidate component "The Hobbit" should be decreased. In response to the determination, the media guidance application may decrease the value associated with edge 622 by instructing media content source 416 or media guidance data source 418 to change the value.

In some embodiments, the media guidance application may add nodes and edges to the knowledge graph. For example, the media guidance application may determine that no node in knowledge graph 600 corresponds to the term "middle-earth movie". The media guidance application may present to a user query 506 asking for confirmation of association between the term "middle-earth movie" and the candidate component "The Hobbit", and receive user input of a user selection of affirmative button 508. In response to receiving the user input, the media guidance application may create node 602 corresponding to the term "middle-earth movie" and edge 622. The media guidance application may then modify the value associated with edge 622. The media guidance application may modify knowledge graph 600 by transmitting information describing the creation of node 602 and edge 622 to media content source 416 or media guidance data source 418 to change the value.

In some embodiments, the media guidance application may modify the value associated with an edge in response to information received from media content source 416 or media guidance data source 418. For example, the media guidance application may receive information through communications network 414 that the actor Johnny Depp and the actress Amber Heard have stopped dating and gotten married. In response to the increased strength of connection between Johnny Depp and Amber Heard, the media guidance application may increase a value associated with edge 624 by transmitting the new value to media content source 416 or media guidance data source 418 to change the value.

Figure 7:
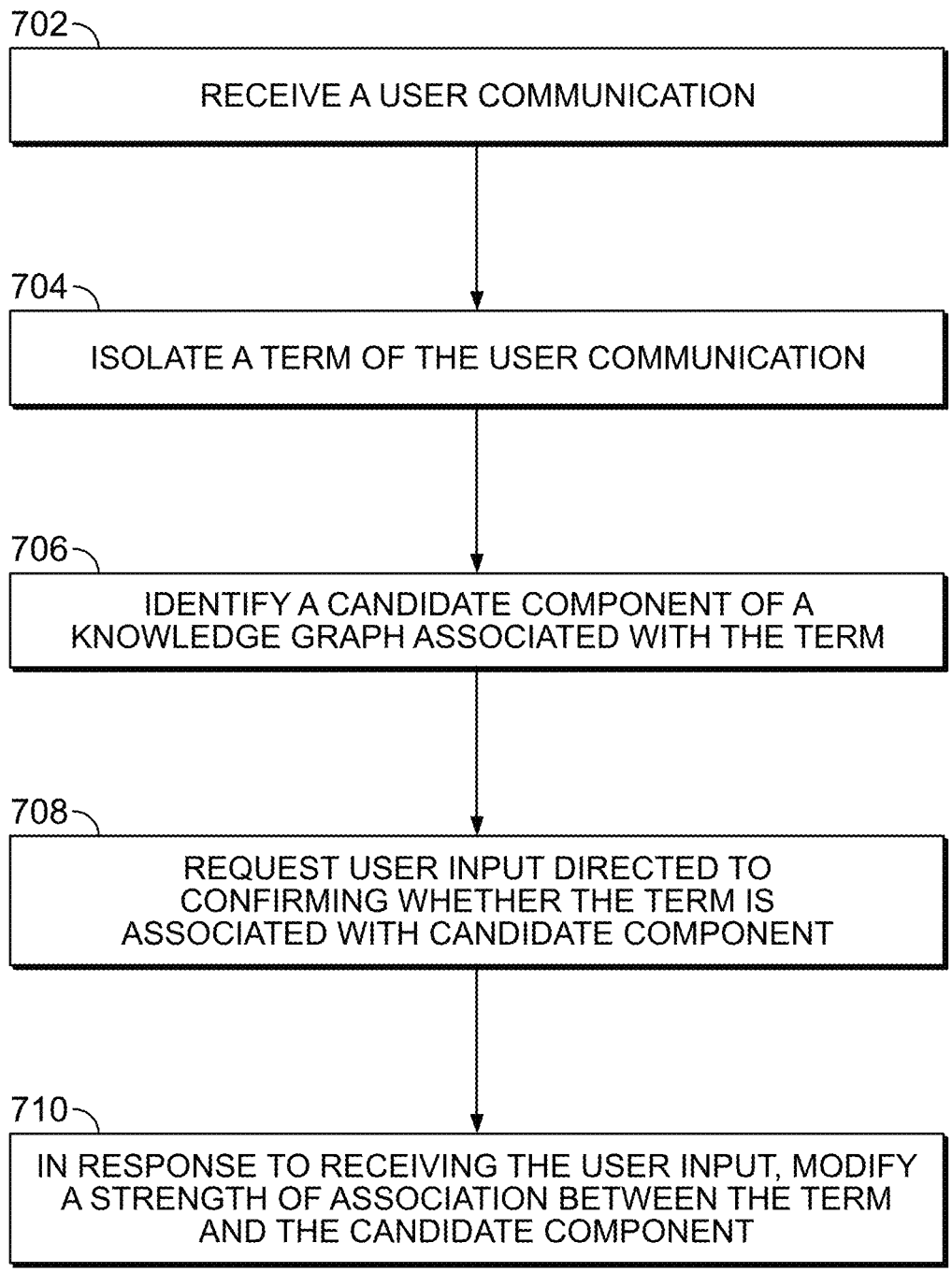
FIG. 7 is a flowchart of illustrative steps involved in updating a knowledge graph, in accordance with some embodiments of the disclosure.

FIG. 7 is a flowchart of illustrative steps involved in updating a knowledge graph in accordance with some embodiments of the disclosure. Process 700 may be executed using control circuitry 304 present in user device 502. It should be noted that the process 700 or any step thereof could be performed on, or provided by, any of the devices shown in FIGS. 3-5. For example, process 700 may be executed by processing circuitry 304 (FIG. 3) as instructed by processing circuitry implemented on user equipment 402, 404, and/or 406 (FIG. 4) in order to provide information to a user. In addition, one or more steps of process 700 may be incorporated into or combined with one or more steps of any other process or embodiment.

Process 700 begins where the media guidance application receives a user communication in block 702. The media guidance application may receive user communication 504 through communications network 414 from user device 502. User communication 504 may be any form of textual or verbal communication received through user input interface 310 on user device 502. User communication 504 may not be related to media assets. For example, user communication 504 may be a portion of a user's interaction with a GPS system. The media guidance application may update different knowledge graphs in response to receiving user communications from different subject areas. For example, the media guidance application may update a media asset knowledge graph, such as knowledge graph 600, in response to receiving user communication 504 about a "middle-earth movie", while it may update a locations knowledge graph in response to receiving a user communication that is a user asking her GPS, "How to get to the tall picturesque steel tower?" User communication 504 may not be a communication from one person to another, and may instead be a communication from one user to a machine. For example, user communication 504 may be a verbal question posed by the user to a mall directory machine.

Process 700 proceeds to block 704, where the media guidance application isolates, using control circuitry 304, a term of the user communication. The media guidance application may isolate a term of user communication 504 using control circuitry 304 to match user communication 504 to templates stored in storage circuitry 308 as described in relation to FIG. 5. In some embodiments, the media guidance application may use heuristics to isolate a term from user communication 504. For example, the media guidance application may isolate a term that is a non-proper noun from each user communication. In some embodiments, the media guidance application may use the frequencies of terms in user communications to isolate a term based on its frequency.

Process 700 proceeds to block 706, where the media guidance application identifies, using control circuitry 304, a candidate component of a knowledge graph associated with the term. The media guidance application may retrieve a part of or the entirety of knowledge graph 600 from storage circuitry 308. The media guidance application may identify the candidate component by identifying candidate components of knowledge graph 600 that are associated with the node corresponding to the term, as described in relation to FIG. 6. In some embodiments, the media guidance application may rank a plurality of candidate components associated with the isolated term, and choose a highest ranked candidate component as the candidate component.

In some embodiments, the media guidance application may select a portion of the knowledge graph used to identify the candidate component based on a context of user communication 504. For example, if user communication 504 occurs when the user asks a mall kiosk a location of a store, the media guidance application may determine that the context of user communication 504 is "Mall" and use a portion of a knowledge graph directed to information about mall stores to identify the candidate component. In another example, if user communication 504 occurs when the user asks her GPS to direct her to a famous landmark, the media guidance application may determine that the context of user communication 504 is "GPS" and use a portion of a knowledge graph directed to GPS related data to identify the candidate component.

Process 700 proceeds to block 708, where the media guidance application requests user input directed to confirming whether the term is associated with the candidate component. The media guidance application may request input by presenting a query on display 312 or speakers 314. The media guidance application may request user input on any device associated with the user. The media guidance application may request user input through any form of textual or verbal feedback the user enters through user input interface 310. The media guidance application may parse the user input to determine if the user affirmed or denied an association between the term and the candidate component. In some embodiments, the media guidance application may request the user input from the user at fixed intervals until user input is received. In some embodiments, the media guidance application may request user input a fixed number of times and then stop requesting user input even if user input has not been received.

Process 700 proceeds to block 710, where the media guidance application, in response to receiving the user input, modifies a strength of association between the term and the candidate component by modifying a value in knowledge graph 600. The media guidance application may increase the strength of association if the user input confirms the association, or decrease the strength of association if the user input denies the association. The media guidance application may modify knowledge graph 600 to change the strength of association between the term and candidate component, as described in relation to FIG. 6. The media guidance application may modify knowledge graph 600 by instructing media content source 416 or media guidance data source 418 through communications network 414 to change knowledge graph 600.

In some embodiments, the media guidance application may modify a locally stored copy of knowledge graph 600 using storage circuitry 308. The media guidance application may then periodically update a master copy of knowledge graph 600 using communications network 414 to transmit the locally stored copy of knowledge graph 600 to a central location such as media content source 416 or media guidance data source 418. In some embodiments, the media guidance application may directly update a master copy of knowledge graph 600 each time the media guidance application modifies knowledge graph 600.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increate the speed of the system or method.

Figure 8:
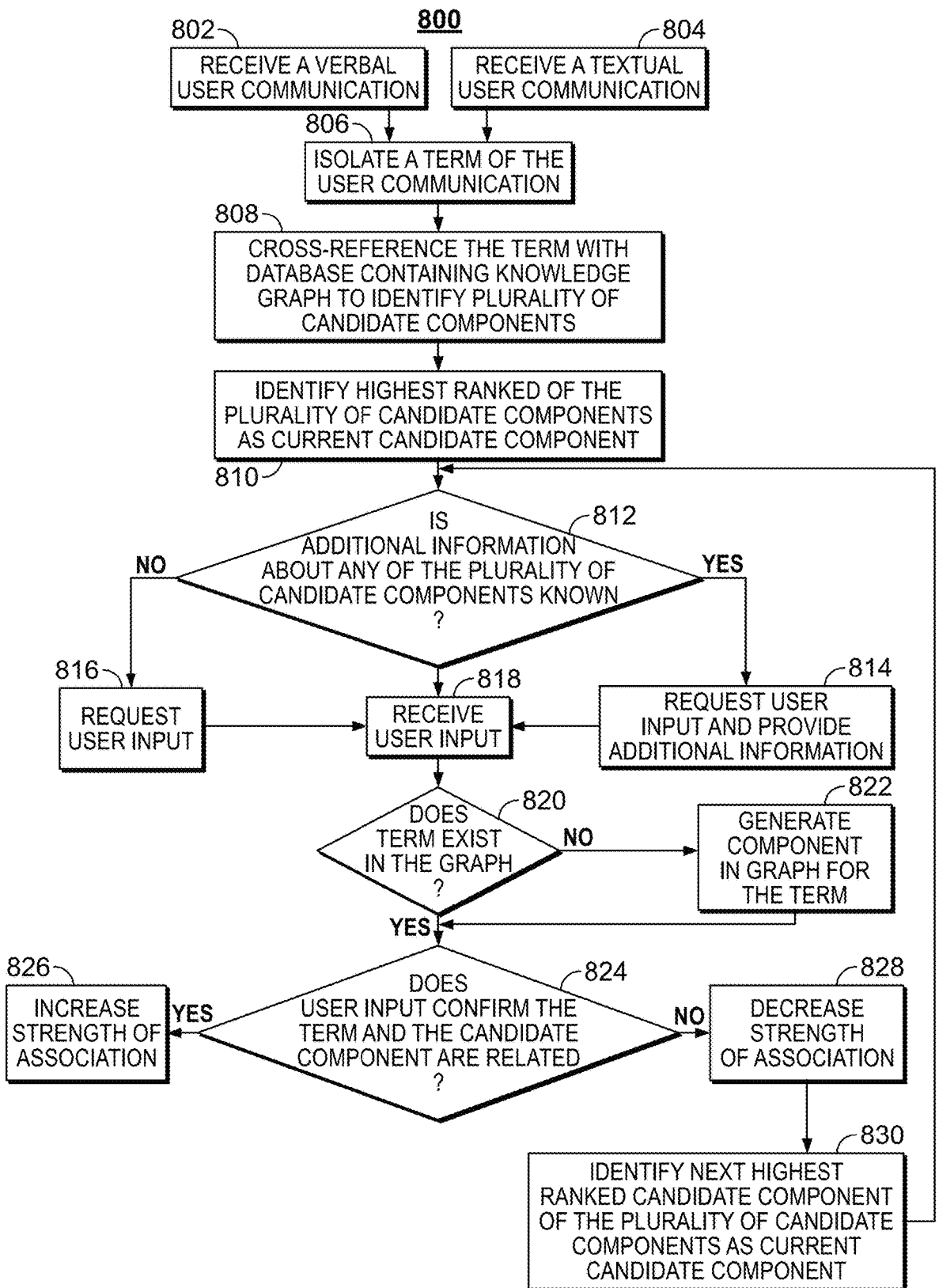
FIG. 8 is a flowchart of illustrative steps for updating a knowledge graph using user communications, in accordance with some embodiments of the disclosure.

FIG. 8 is a flowchart of illustrative steps for updating a knowledge graph using user communications in accordance with some embodiments of the disclosure. It should be noted that the process 800 or any step thereof could be performed on, or provided by, any of the devices shown in FIGS. 3-5. For example, process 800 may be executed by processing circuitry 304 (FIG. 3) as instructed by processing circuitry implemented on user equipment 402, 404, and/or 406 (FIG. 4) in order to provide information to a user. In addition, one or more steps of process 800 may be incorporated into or combined with one or more steps of any other process or embodiment.

Process 800 begins when the media guidance application receives user communication 504. The media guidance application may receive a verbal communication at block 802 or a textual communication at step 804. The media guidance application may receive user communication 504 through user input interface 310 at user device 502. The media guidance application may convert verbal user communication received at block 802 to a transcript of the verbal user communication. The media guidance application may parse the transcript of the verbal user communication to remove artifacts of spoken communication such as filler words and pauses.

Process 800 proceeds to block 806, where the media guidance application isolates a term of user communication 504 using control circuitry 304. This may happen as described in relation to block 704.

Process 800 proceeds to block 808, where the media guidance application cross-references, using control circuitry 304, the term with a knowledge graph stored in a database to identify a plurality of candidate components of the knowledge graph. In some embodiments, the media guidance application may be configured to identify only one candidate component. In some embodiments, the database containing knowledge graph 600 may be stored using storage circuitry 308 or accessed through communications network 414. In some embodiments, the media guidance application may only identify a maximum of a pre-determined number of candidate components to reduce computational complexity.

Process 800 proceeds to block 810, where the media guidance application identifies, using control circuitry 304, a highest ranked candidate component of the plurality of candidate components as the current candidate component. In some embodiments, the plurality of candidate components may have been ranked using criteria such as a date associated with the candidate component, metadata association with the candidate component, relevance of the candidate component to the term, or a distance of the candidate component from the term on the knowledge graph.

Process 800 proceeds to block 812, where the media guidance application determines, using control circuitry 304, if additional information about any of the plurality of candidate components is known. If the media guidance application determines that additional information 512 is known, media guidance application may provide the additional information while requesting user input as shown in block 814. The media guidance application may provide additional information 512 through display 312 or speakers 314. If the media guidance application determines that additional information 512 is not known, the media guidance application may request user input without providing additional information as shown in block 816. In some embodiments, the media guidance application may provide a setting on user device 502 to enable the user to indicate whether the user wants to be provided with additional information 512.

Process 800 proceeds to block 818, where the media guidance application receives from user input interface 310 user input. The media guidance application may receive user input in many forms, such as a user selection of a button or option provided to the user by the media guidance application, a verbal communication from the user, or a video from the user. The media guidance application may parse the user input to determine if the user confirmed or denied an association between the term and the candidate component. For example, the media guidance application may provide the user with query 506 asking "Do you think the connection between Johnny Depp and Amber Heard is getting stronger?" in response to receiving user communication 504 "I heard Johnny Depp married Amber Heard!" The user input may be a verbal sound clip from the user stating, "I think they're getting much closer." The media guidance application may determine, using control circuitry 304, that the user input corresponds to a confirmation of an increasing strength of association between Johnny Depp and Amber Heard.

Process 800 proceeds to block 820, where the media guidance application determines if the term exists in knowledge graph 600. The media guidance application may determine if a node corresponding to the term exists in knowledge graph 600. If such a node does not exist, the media guidance application may generate a node for the term in knowledge graph 600 and create an edge to connect it to the associated candidate component, as shown in block 822.

Process 800 proceeds to block 824, where the media guidance application determines, using control circuitry 304, if the user input confirms that the term and the candidate component are related. If the user input confirms the association, the media guidance application increases a strength of association between the term and the candidate component by modifying knowledge graph 600 as shown in block 826. The media guidance application may then wait for a next user communication to be received at blocks 802 or 804. If the user input denies the association, the media guidance application decreases a strength of association between the term and the candidate component by modifying knowledge graph 600 as shown in block 828. In some embodiments, decreasing a strength of association between a term and candidate component may include removing an edge connecting the term and the candidate component in knowledge graph 600.

Process 800 proceeds to block 830, where the media guidance application identifies the next-highest-ranked candidate component of the plurality of candidate components as the current candidate component. If no candidate components remain, the media guidance application may wait for a next user communication to be received at blocks 802 or 804. If a next-highest-ranked candidate component is found, process 800 proceeds again to block 812.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing recommendations based on a user's conversational communications, the method comprising:
   receiving, via a user interface, a user communication;
   extracting a first term of the user communication;
   comparing the first term to a plurality of terms represented by a respective plurality of nodes in a knowledge graph;
   in response to determining that no node in the knowledge graph represents a term corresponding to the first term:
   identifying a candidate node;
   generating for output, via the user interface, a prompt to confirm an association between the first term and a second term represented by the candidate node of the knowledge graph; and
   in response to receiving, in response to the prompt, a confirmation of association between the first term and the second term, creating a new node corresponding to the first term and an edge connecting the new node with the candidate node in the knowledge graph; and
   generating a content recommendation associated with the second term.

2. The method of claim 1, further comprising:
   receiving, via the user interface, a second user communication;
   identifying a third term of the second user communication, wherein the third term corresponds to the candidate node;
   generating for output, via the user interface, a second prompt for user input directed to confirming whether the third term is associated with the first term; and
   in response to receiving the user input, modifying a strength of association between the new node and the candidate node.

3. The method of claim 2, wherein modifying the strength of associated between the new node and the candidate node further comprises:
   determining whether the user input confirms or denies that the third term is associated with the first term; and
   in response to determining that the user input confirms that the third term is associated with the first term, increasing the strength of association between the new node and the candidate node.

4. The method of claim 2, wherein modifying the strength of associated between the new node and the candidate node further comprises:
   determining whether the user input confirms or denies that the third term is associated with the first term; and
   in response to determining that the user input denies that the third term is associated with the first term, decreasing the strength of association between the new node and the candidate node.

5. The method of claim 2, wherein the strength of association is represented by a weight allocated to an edge connecting the new node and the candidate node.

6. The method of claim 1, wherein generating the prompt further comprises providing information associated with the candidate node.

7. The method of claim 1, further comprising providing information associated with an additional component of the knowledge graph that has high strength of association between the first term and the additional component.

8. The method of claim 1, wherein identifying the candidate node further comprises cross-referencing the first term with candidate terms represented by candidate nodes of the knowledge graph stored in a database.

9. The method of claim 1, wherein identifying the candidate node further comprises:
   identifying a plurality of candidate nodes of the knowledge graph;
   ranking each of the plurality of candidate nodes;
   identifying a highest ranked candidate node of the plurality of candidate nodes as the candidate node;
   receiving a user input that denies that the first term is associated with the candidate node; and
   in response to receiving the user input, identifying a next highest ranked candidate node of the plurality of candidate nodes as the candidate node.

10. The method of claim 1, wherein the user communication is verbal or textual.

11. A system for providing recommendations based on a user's conversational communications, the system comprising:
    storage circuitry configured to store a knowledge graph having a plurality of nodes and a plurality of edges;
    communications circuitry configured to receive a user communication; and
    control circuitry configured to:
    receive, via a user interface, a user communication;
    extract a first term of the user communication;
    compare the first term to a plurality of terms represented by a respective plurality of nodes in a knowledge graph;
    in response to determining that no node in the knowledge graph represents a term corresponding to the first term:
    identify a candidate node;
    generate for output, via the user interface, a prompt to confirm an association between the first term and a second term represented by the candidate node of the knowledge graph; and
    in response to receiving, in response to the prompt, a confirmation of association between the first term and the second term, create a new node corresponding to the first term and an edge connecting the new node with the candidate node in the knowledge graph; and
    generate a content recommendation associated with the second term.

12. The system of claim 11, wherein the control circuitry is further configured to:
- receive, via the user interface, a second user communication;
- identify a third term of the second user communication, wherein the third term corresponds to the candidate node;
- generate for output, via the user interface, a second prompt for user input directed to confirming whether the third term is associated with the first term; and
- in response to receiving the user input, modifying a strength of association between the new node and the candidate node.

13. The system of claim 12, wherein the control circuitry configured to modify the strength of associated between the new node and the candidate node is further configured to:
- determine whether the user input confirms or denies that the third term is associated with the first term; and
- in response to determining that the user input confirms that the third term is associated with the first term, increase the strength of association between the new node and the candidate node.

14. The system of claim 12, wherein the control circuitry configured to modify the strength of associated between the new node and the candidate node is further configured to:
- determine whether the user input confirms or denies that the third term is associated with the first term; and
- in response to determining that the user input denies that the third term is associated with the first term, decrease the strength of association between the new node and the candidate node.

15. The system of claim 12, wherein the strength of association is represented by a weight allocated to an edge connecting the new node and the candidate node.

16. The system of claim 11, wherein the control circuitry configured to generate the prompt is further configured to provide information associated with the candidate node.

17. The system of claim 11, wherein the control circuitry is further configured to provide information associated with an additional component of the knowledge graph that has high strength of association between the first term and the additional component.

18. The system of claim 11, wherein the control circuitry configured to identify the candidate node is further configured to cross-reference the first term with candidate terms represented by candidate nodes of the knowledge graph stored in a database.

19. The system of claim 11, wherein the control circuitry configured to identify the candidate node is further configured to:
- identify a plurality of candidate nodes of the knowledge graph;
- rank each of the plurality of candidate nodes;
- identify a highest ranked candidate node of the plurality of candidate nodes as the candidate node;
- receive a user input that denies that the first term is associated with the candidate node; and
- in response to receiving the user input, identify a next highest ranked candidate node of the plurality of candidate nodes as the candidate node.

20. The system of claim 11, wherein the user communication is verbal or textual.

\* \* \* \* \*